United States Patent [19]

Haas

[11] Patent Number: 4,611,823
[45] Date of Patent: Sep. 16, 1986

[54] COLLAPSIBLE CARRIER STAND FOR HEAVY MACHINE

[75] Inventor: John L. Haas, Roland Heights, Calif.

[73] Assignee: Roco Tool Group, Inc., Monterey Park, Calif.

[21] Appl. No.: 700,490

[22] Filed: Feb. 11, 1985

[51] Int. Cl.⁴ .............................................. B62B 3/02
[52] U.S. Cl. .................................. 280/641; 108/119; 248/439; 280/651
[58] Field of Search ............... 280/641, 645, 651, 652, 280/659, DIG. 6; 108/118, 119, 120; 248/164, 432, 166, 439; 297/56

[56] References Cited

U.S. PATENT DOCUMENTS

| | | | |
|---|---|---|---|
| 2,492,676 | 12/1949 | Zajicek | 280/641 |
| 2,531,856 | 11/1950 | Marcouiller | 280/641 |
| 2,890,061 | 6/1959 | Watson | 280/DIG. 6 |
| 3,274,627 | 9/1966 | Behnke | 10/96 R |
| 3,782,749 | 1/1974 | Wiczer | 280/641 |
| 3,797,695 | 3/1974 | Law | 248/164 |
| 4,199,170 | 4/1980 | Hubner et al. | 280/641 |

Primary Examiner—John J. Love
Assistant Examiner—Eric Culbreth
Attorney, Agent, or Firm—William W. Haefliger

[57] ABSTRACT

A collapsible carrier for a heavy machine, comprising
(a) an upper platform adapted to support the machine,
(b) first leg structure pivotally attached to the platform and extending downwardly and forwardly relative to the platform,
(c) second leg structure having upper extent located to support the platform and extending downwardly and rearwardly relative to the platform,
(d) the first and second leg structures pivotally interconnected below the level of said platform,
(e) there being a slide surface associated with the platform and presented to transmit loading to the second leg structure upper extent as said upper extent travels therealong between first and second positions corresponding to raised and lowered positions of the platform, and there being stops associated with the platform to limit such travel at the first and second positions,
(f) releasable mechanism to lock the second leg structure upper extent to the platform at the first and second positions,
(g) and a counterbalance operatively connected with said first and second leg structures to yieldably resist downward movement of the platform, thereby counterbalancing the weight of the machine.

11 Claims, 15 Drawing Figures

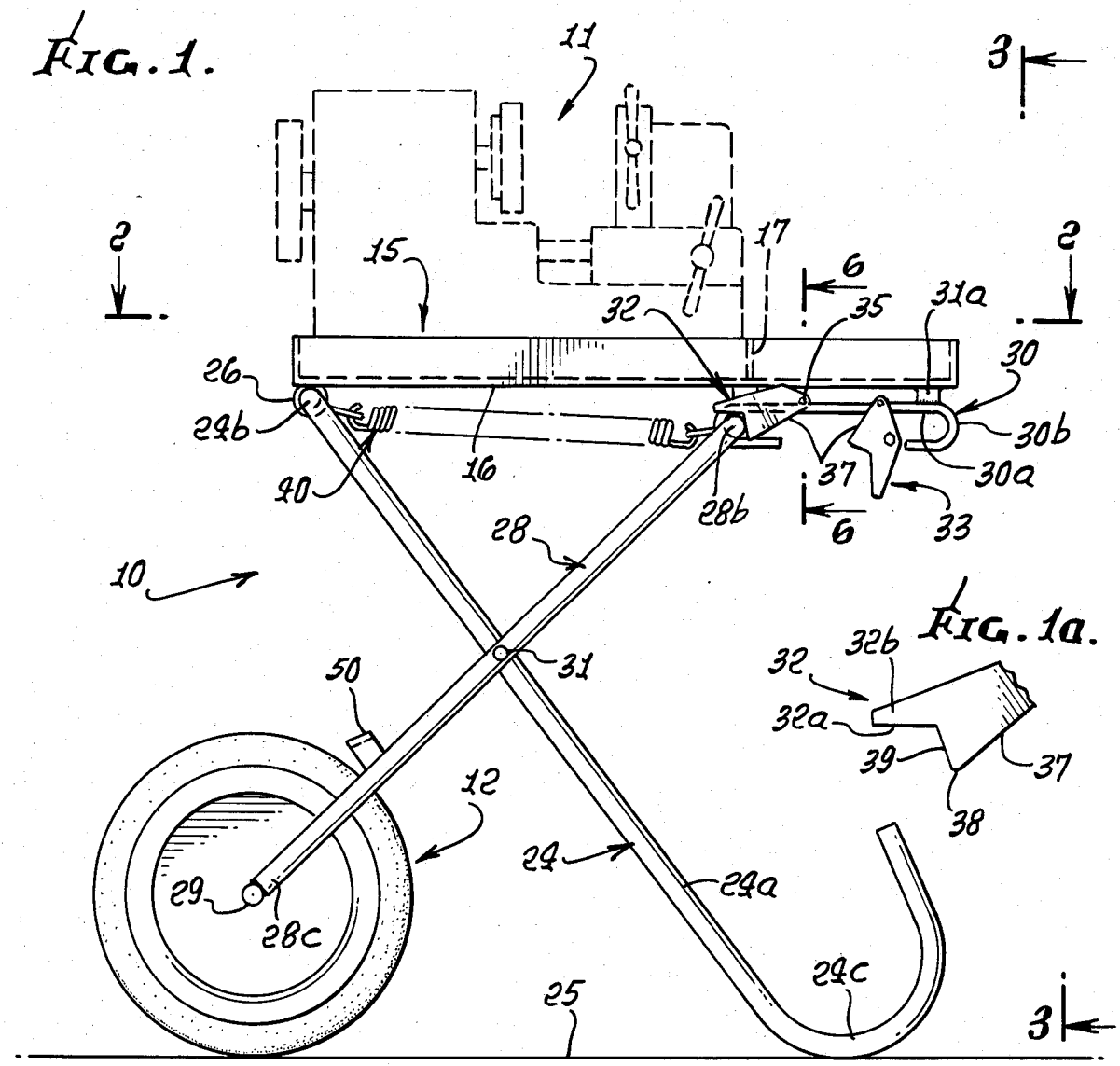
FIG. 1.
FIG. 1a.
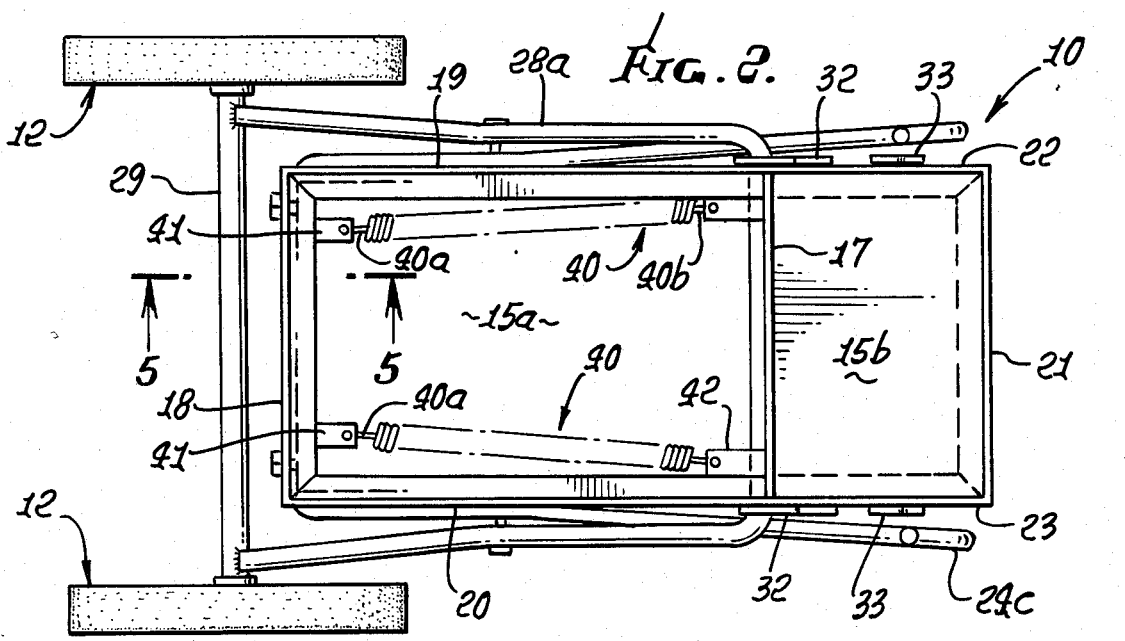
FIG. 2.

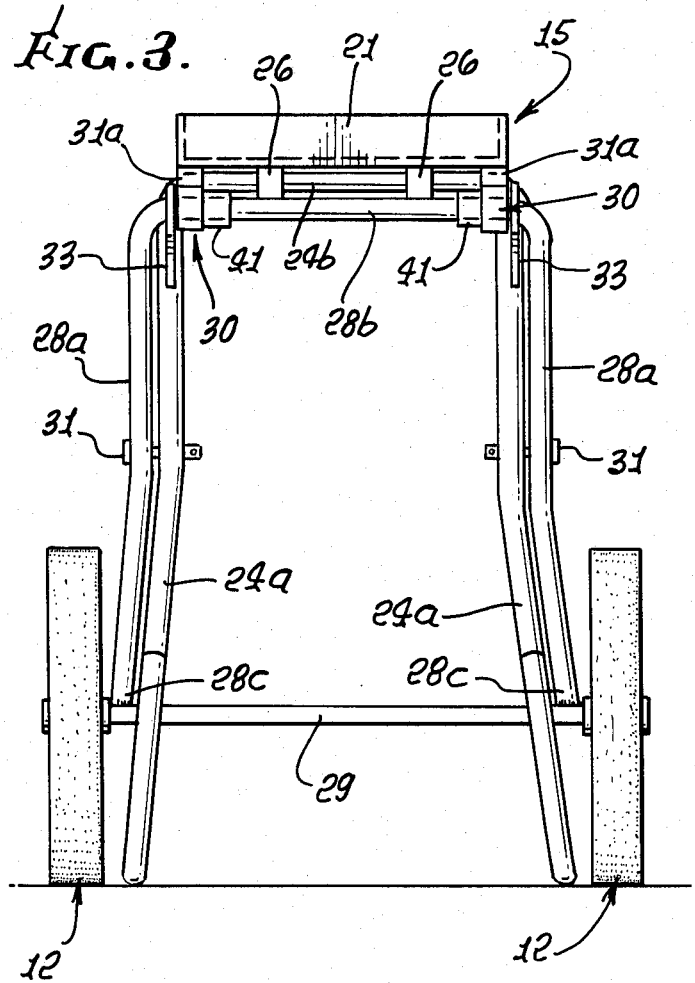
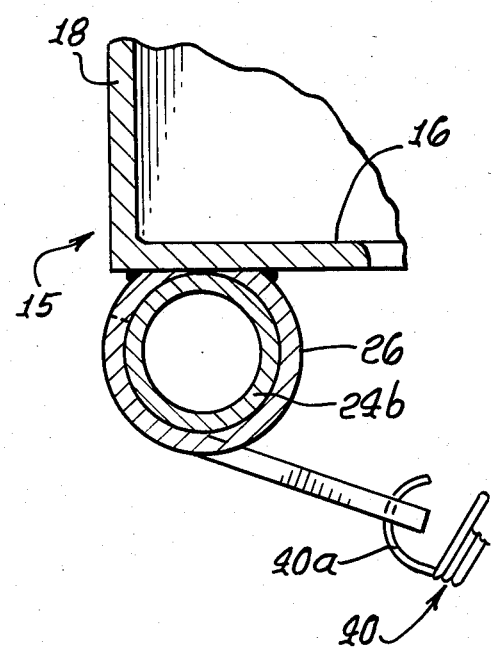
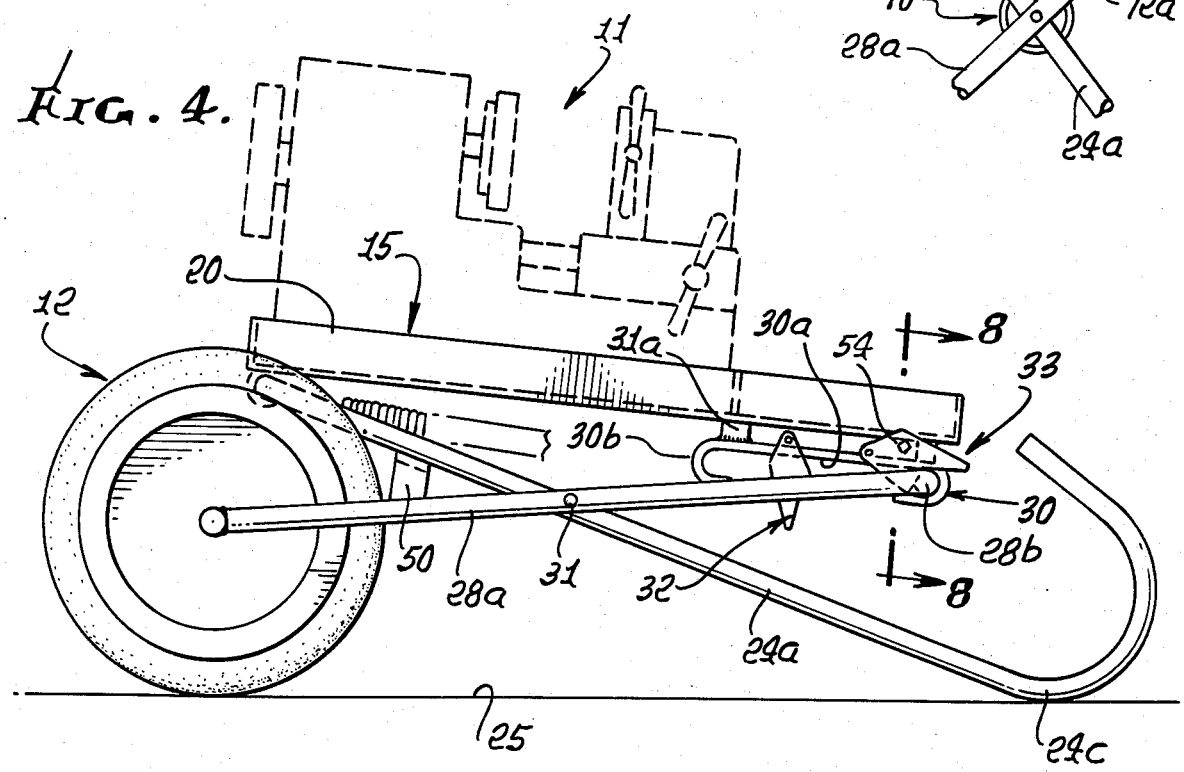

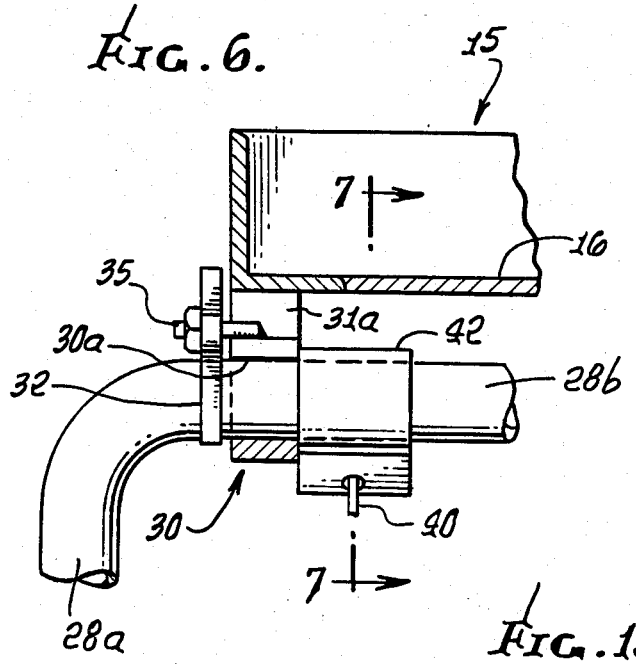
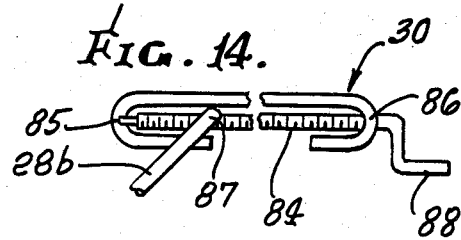
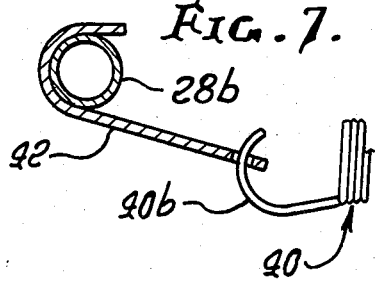
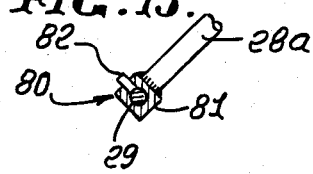
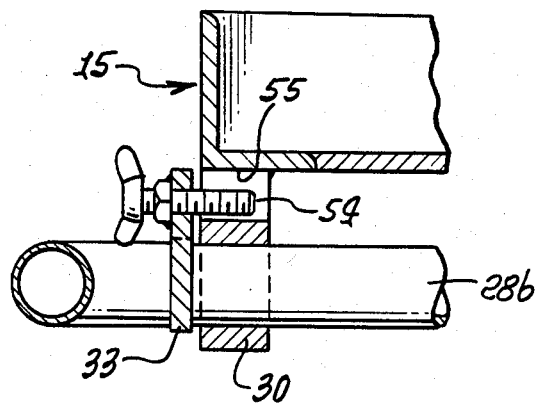
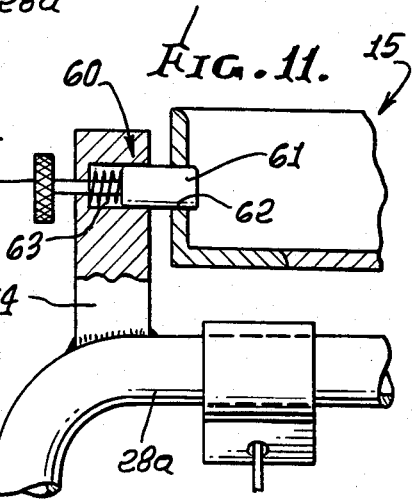
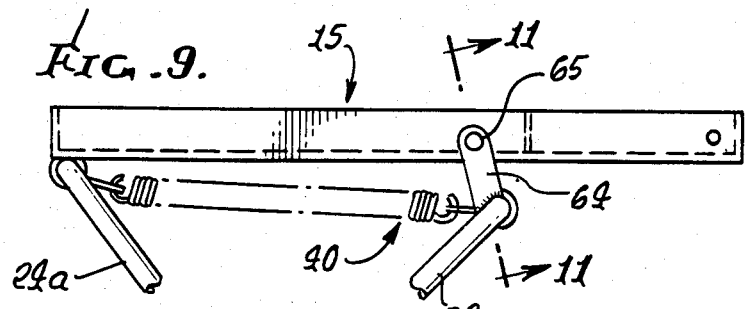
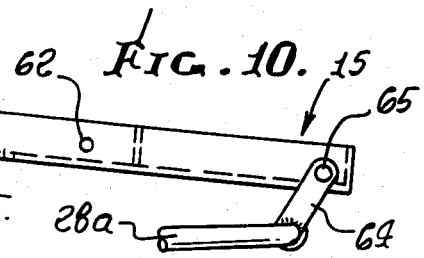

COLLAPSIBLE CARRIER STAND FOR HEAVY MACHINE

BACKGROUND OF THE INVENTION

This invention relates generally to portable machinery, and more particularly to carrier apparatus for transporting a pipe threader between desired locations, and enabling raising and lowering of the threader.

There is need for portable carrier apparatus for heavy machinery such as pipe threaders and the like; and there is also need for raising and lowering the pipe threader, as between desired operating and stored positions. The extreme weight of sure steel machinery; however, has previously prevented ease of portability combined with elevation control, or made same excessively complicated. See for example U.S. Pat. No. 3,274,627 disclosing a heavy pipe threader, which is not easily controlled in the desired manner.

SUMMARY OF THE INVENTION

It is a major object of the invention to provide carrier apparatus which meets the above need, and provides a number of unusual advantages both structurally and operatively, ease of level control being one of same, and simplicity being another.

Basically, the carrier comprises (a) an upper platform adapted to support the machine, (b) first leg means pivotally attached to the platform and extending downwardly and forwardly relative to the platform, (c) second leg means having upper extent located to support the platform and extending downwardly and rearwardly relative to the platform, (d) the first and second leg means pivotally interconnected below the level of the platform, (e) there being a slide surface associated with the platform presented to transmit loading to the second leg means upper extent as the upper extent travels therealong between first and second positions corresponding to raised and lowered positions of the platform, and there being stops associated with the platform to limit such travel at said first and second positions, (f) releasable means to lock said upper extent to the platform at the first and second positions, (g) and counterbalance means operatively connected with the first and second leg means to yieldably resist downward movement of the platform, thereby counterbalancing the weight of the machine.

Further, and as will be seen, the slide surface is advantageously defined by a guide plate the opposite ends of which extend downwardly and reversely to define the stops; and the first leg means has upper end extent pivotally attached to the platform, and also to which the counterbalance spring means is attached, below the level of the platform.

Additionally, the releasable means may advantageously comprise latch cams carried by the guide plate to move into latching position relative to said second leg means upper end extent, in each of said first and second positions, and being manually releasable from the latching positions to allow said travel; and the cams may have latch surfaces presented to swing into releasable latching position in response to arrival of the second leg means upper extent at such first and second positions. In this regard, the cams may be pivotally carried to swing downwardly into latching position, and to be cammed upwardly by the leg means upper extent, during said travel thereof, the cams having cam surfaces engageable by the second leg means upper extent; and the cams may also have finger elements projecting to be easily swung by the operator to pivot the cams, and thereby release the second leg means upper extent to travel.

For safety reasons, there may be lock means to releasably lock the second leg means in position relative to the upper platform in the first position, as will be seen.

These and other objects and advantages of the invention, as well as the details of an illustrative embodiment, will be more fully understood from the following specification and drawings, in which:

DRAWING DESCRIPTION

FIG. 1 is a side elevation showing the carrier apparatus in raised position; and FIG. 1a is an enlargement of a latch cam;

FIG. 2 is a top plan view on lines 2—2 of FIG. 1;

FIG. 3 is an end view on lines 3—3 of FIG. 1;

FIG. 4 is a side elevation showing the carrier apparatus in lowered or collapsed position;

FIG. 5 is an enlarged fragmentary section taken on lines 5—5 of FIG. 2;

FIG. 6 is an enlarged fragmentary section taken on lines 6—6 of FIG. 1;

FIG. 7 is a fragmentary section taken on lines 7—7 of FIG. 6;

FIG. 8 is an enlarged fragmentary section on lines 8—8 of FIG. 4;

FIGS. 9 and 10 are fragmentary side elevations showing alternate leg means positions associated with an alternate locking means;

FIG. 11 is an enlarged section on lines 11—11 of FIG. 9, showing the alternate locking means;

FIG. 12 shows an alternate spring structure;

FIG. 13 shows an alternate removable axle connection; and

FIG. 14 shows an alternate hand-crank adjustment.

DETAILED DESCRIPTION

As shown in the drawings, a collapsible carrier 10 is provided for a heavy machine 11, as for example a portable pipe threader. The carrier has a raised position (see FIG. 1) in which the machine 11 may be transported about, as by virtue of wheels 12 associated with the carriage 10; and a lowered position (see FIG. 4) in which the machine may be used, as for example in pipe threading.

The carrier 10 includes an upper platform 15 which is horizontal in FIG. 1, and is tilted from horizontal in FIG. 4. The platform is adapted to carry the heavy machine 11, and may include a first tray 15a in which the machine is seated, and a second tray 15b, as for example a tool tray. The two trays have a common bottom wall 16 and a common divider flange 17; and there are upstanding flanges or walls 18—23 associated with the trays, as shown.

First leg means 24 is pivotally attached to the platform to extend downwardly and forwardly relative to the platform. See for example the two tubular metallic legs 24a interconnected by a tubular cross-piece 24b, and extending in laterally spaced, parallel relation to terminate at upturned terminals or feet 24c engaging the floor 25. Cross-piece 24b extends laterally immediately beneath the left end of the platform in FIG. 1, to partially support the platform and its machine load. Pivot brackets 26 form bearings for the cross-piece, and are welded to the bottom wall 16 of the tray.

Second leg means 28 is also provided to have upper extent located to support the platform, and to extend downwardly and rearwardly relative to the platform. See for example the two tubular metallic legs 28a interconnected by tubular cross-piece 28b, and extending downwardly in laterally spaced, parallel relation, to lower end terminals 28c. The latter support a laterally horizontally extending axle 29 for the wheels 12. Cross-piece 28b is shown extending laterally immediately beneath a slide surface or surfaces 30a associated with the platform, to partially support the platform and its machine load. The two pairs 24a and 28a of legs are pivotally interconnected as by pins 31, to provide scissors connections, allowing movement of the legs and platform between FIG. 1 and FIG. 4 positions.

In accordance with an important aspect of the invention, there are two slide surfaces 30a defined by two laterally spaced, like guide plates 30, attached as by spacers 31a to the underside of the platform, at the right end thereof, in FIG. 1. Slide surfaces 30a are presented downwardly to transmit loading to the second legs via cross-piece 28b (the upper extent of the legs) as the cross-piece 28b travels rightwarldy and leftwardly between first and second positions corresponding respectively to raised and lowered (FIGS. 1 and 4) positions of the platform. Stops are associated with the platform to limit such travel at the raised and lowered positions; for example, the guide plates have downwardly and reversely turned ends 30b to define such stops configured to capture the cross-piece as shown, and cooperating with releasable means, such as latches 32 and 33 to lock the cross-piece at such first and second positions. The two latches 32 automatically capture and latch the cross-piece 28b as it travels leftwardly toward and into FIG. 1 position; and the two latches 33 automatically capture and latch the cross-piece 28b as it travels rightwardy toward and into FIG. 4 position, whereby retention of the heavy machine in either raised or lowered position is assured. The reversely turned terminal portions 30b of the guide plates extend in spaced relation from the legs 28a, as do the cams, 32 and 33, to prevent leg binding; however, portions 30b also act to provide means associated with the platform and legs to guide leg cross-piece travel, longitudinally.

The latch cams 32 are shown as pivotally attached at 35 to guide plate structure 30, and tend to gravitationally swing downwardly into positions at the sides of the guide plates to be swingably cammed upwardly by the cross-piece 28b. To this end they have angled cam surfaces 37, and as cross-piece 28b moves leftwardly, it engages cam surfaces of cams 32 to pivot them clockwise in FIG. 1, until the cross-piece passes over intersections 38 of cam surfaces 37 with retention or latch surfaces 39. The cams then again gravitationally drop pivot until retention surfaces 39 block escape of the cross-piece from captured position. Cam stop shoulders 32a engage the top of the cross-piece at this time. Shoulders 32a are on a jutting finger piece 32b, which is easily graspable by the operator to lift the cams 32 at such time as rightward travel of the cross-piece 28a toward FIG. 4 position is desired. Cams 33 are configured and operated in the same way, to releasably retain the cross-piece in FIG. 4 position.

Finally, counterbalance means is operatively connected with the first and second leg means to yieldably resist downward movement of the platform under the weight exerted by the heavy machine. As shown, the counterbalance means includes a tension spring or springs 40. The left ends 40a of the springs are connected to brackets 41 attached to cross-piece 24b; and the right ends 40b of the springs are connected to brackets 42 attached to cross-piece 28b. The spring tension is set to enable lifting and lowering of the platform and heavy machine, in response to very little upward or downward force exertion on the platform. Note stops 50 positioned on legs 28a to engage legs 24a (see FIG. 4) and transmit loading from legs 24a to legs 28a in down position of the apparatus.

FIG. 8 shows the provision of cam auxiliary lock to prevent sudden upward extension of the platform, in response to counterbalance spring contraction, as for example could occur if the machine 11 were lifted from the platform. As shown, the lock comprises a member 54 projecting sidewardly, into a hole 55 in guide plate 30. Member 54 is carried by a cam 33, and is shown as having threaded connection to the cam so as to be advanced into or retracted from the hole 55, as desired. Thus, the cam 33 holds the cross-piece 28b in retained position (see FIG. 4) until member 54 is retracted from the hole 55, allowing cam 33 to be pivoted; conversely, cam 33 cannot be inadvertently unlatched when pin member 54 is in hole 35.

Finally, FIGS. 9–11 show an alternate safety catch 60, to hold the legs against inadvertent collapse. Thus, pin 61 is urged into a hole 62 in the platform 15, as by spring 63. Pin is carried by element 64 mounted on leg cross-piece 28a. A pull knob 65 releases the pin from the hole.

FIG. 12 shows the counterbalance in alternate form of a torsion spring 70 having arms 71 and 72 respectively connected to the legs 24a and 28a at 71a and 72a. The spring may extend between the legs of each pair and be connected to leg 24a of one pair and leg 28a of the other pair.

FIG. 13 shows a removable connection 80 for axle 29, as including coupler sleeves 81 on the lower ends of legs 28a, to receive the axle, and pins 82 in sleeves 81 to lock the axle in position.

FIG. 14 shows a rotatable screw 84 having connection to guide plate 30 at 85 and 86, and threaded connection to cross-piece 28b at 87. When crank 88 is hand turned, the screw rotates and displaces cross-piece 28b leftwardly or rightwardy.

I claim:

1. A collapsible carrier for a heavy machine, comprising
    (a) an upper platform adapted to support the machine,
    (b) first leg means pivotally attached to the platform and extending downwardly and forwardly relative to the platform,
    (c) second leg means having upper extent located to support the platform and extending downwardly and rearwardly relative to the platform,
    (d) the first and second leg means pivotally interconnected below the level of said platform,
    (e) there being a slide surface associated with the platform and presented to transmit loading to said second leg means upper extent as said upper extent travels therealong between first and second positions corresponding to raised and lowered positions of the platform, and there being stops associated with the platform to limit said travel at said first and second positions, (f) releasable lock means to lock said second leg means upper extent to the platform at said second leg means first and second positions, (g) and counterbalance means operatively connected with said first and second leg means to yieldably resist downward movement of the platform, thereby counterbalancing the weight of said machine, said counterbalance means including a tension spring having an end operatively connected to said second leg means upper extent, at a location below the level of said platform, (h) said slide surface being defined by a guide plate the opposite ends of which extend downwardly and reversely with U-shape to form said stops, the guide plate downwardly open between said U-shaped ends and below said slide surface, (i) said releasable lock means including a lock element operatively engaged by the second leg means upper extent and moveable upwardly adjacent one of said U-shaped guide plate ends in said first position of the second leg means upper extent, (j) the first leg means having upper end extent pivotally attached to the platform, and also to which the counterbalance means is attached, below the level of the platform, (k) said releasable lock means comprising latch elements carried by the guide plate to move into latching position relative to said second leg means upper extent in each of said first and second positions, and being manually releasable from said latching positions to allow travel.

2. The carrier of claim 1 including said machine carried on the platform.

3. The carrier of claim 2 wherein said machinery comprises a pipe threading machine.

4. The carrier of claim 1 including an axle supporting and removably connected to lower extent of said second leg means, and wheels supported by the axle.

5. A collapsible carrier for a heavy machine, comprising (a) an upper platform adapted to support the machine, (b) first leg means pivotally attached to the platform and extending downwardly and forwardly relative to the platform, (c) second leg means having upper extent located to support the platform and extending downwardly and rearwardly relative to the platform, (d) the first and second leg means pivotally interconnected below the level of said platform, (e) there being a slide surface associated with the platform and presented to transmit loading to said second leg means upper extent as said upper extent travels therealong between first and second positions corresponding to raised and lowered positions of the platform, and there being stops associated with the platform to limit said travel at said first and second positions, (f) releasable lock means to lock said second leg means upper extent to the platform at said second leg means first and second positions, (g) and counterbalance means operatively connected with said first and second leg means to yieldably resist downward movement of the platform, thereby counterbalancing the weight of said machine, said counterbalance means including a tension spring having an end operatively connected to said second leg means upper extent, at a location below the level of said platform, (h) said slide surface being defined by a guide plate the opposite ends of which extend downwardly and reversely with U-shaped to form said stops, the guide plate downwardly open between said U-shaped ends and below said slide surface, (i) said releasable lock means including a lock element operatively engaged by the second leg means upper extent and moveable upwardly adjacent one of said U-shaped guide plate ends in said first position of the second leg means upper extent, (j) said releasable means comprising latch cams carried by the guide plate to move into latching position relative to said second leg means upper end extent in each of said first and second positions, and being manually releasable from said latching positions to allow said travel.

6. The carrier of claim 5 wherein said cams have latch surfaces presented to swing into releasable latching position in response to arrival of said second leg means upper extent at said first and second positions.

7. The carrier of claim 5 wherein said latch cams are pivotally carried to swing downwardly into latching position, and to be cammed upwardly by said leg means upper extent during said travel thereof, said cams having cam surfaces engagable by said second leg means upper extent.

8. The carrier of claim 5 wherein said second leg means extend downwardly in laterally spaced relation to said cams and said guide plate to prevent binding during travel between said positions.

9. The carrier of claim 7 wherein said lock means includes another lock element carried by one of said latch cams to lock said one latch cam in down position.

10. The carrier of claim 6 wherein the cams also have stop shoulders to engage the top of the second leg means upper extent when the latter is retained by the latch surfaces against escape from position adjacent one of said stops.

11. The carrier of claim 10 wherein the cams also have finger elements projecting to be easily swung to pivot the cams and thereby release the second leg means.

* * * * *